(12) United States Patent
McCuller

(10) Patent No.: US 9,253,494 B2
(45) Date of Patent: Feb. 2, 2016

(54) ALTERING STREAMING VIDEO ENCODING BASED ON USER ATTENTION

(71) Applicant: Amazon Technologies, Inc., Seattle, WA (US)

(72) Inventor: Patrick G. McCuller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/554,322

(22) Filed: Nov. 26, 2014

(65) Prior Publication Data

US 2015/0078459 A1 Mar. 19, 2015

Related U.S. Application Data

(62) Division of application No. 12/957,450, filed on Dec. 1, 2010, now Pat. No. 8,902,970.

(51) Int. Cl.

| | |
|---|---|
| *H04B 1/66* | (2006.01) |
| *H04N 19/61* | (2014.01) |
| *H04N 19/162* | (2014.01) |
| *H04N 19/115* | (2014.01) |
| *H04N 19/127* | (2014.01) |
| *H04N 19/167* | (2014.01) |
| *H04N 19/423* | (2014.01) |
| *A63F 13/00* | (2014.01) |
| *H04N 21/6379* | (2011.01) |
| *H04N 19/17* | (2014.01) |
| *H04N 19/44* | (2014.01) |
| *H04N 19/70* | (2014.01) |
| *H04N 19/85* | (2014.01) |
| *H04N 21/234* | (2011.01) |

(52) U.S. Cl.
CPC .............. *H04N 19/162* (2014.11); *A63F 13/00* (2013.01); *H04N 7/5006* (2013.01); *H04N 19/115* (2014.11); *H04N 19/127* (2014.11); *H04N 19/167* (2014.11); *H04N 19/17* (2014.11); *H04N 19/423* (2014.11); *H04N 19/44* (2014.11); *H04N 19/70* (2014.11); *H04N 19/85* (2014.11); *H04N 21/6379* (2013.01); *H04N 21/23418* (2013.01)

(58) Field of Classification Search
None
See application file for complete search history.

(56) References Cited

U.S. PATENT DOCUMENTS

| | | |
|---|---|---|
| 8,565,323 B1 | 10/2013 | McCuller |
| 8,908,776 B1 | 12/2014 | McCuller |
| 2006/0053442 A1 | 3/2006 | Ridderheim et al. |
| 2007/0104369 A1* | 5/2007 | Weatherhead ................ 382/181 |
| 2009/0219411 A1* | 9/2009 | Marman et al. ........... 348/231.99 |
| 2009/0251613 A1* | 10/2009 | Kervec et al. ................. 348/700 |
| 2010/0060586 A1* | 3/2010 | Pisula et al. .................. 345/169 |
| 2010/0150252 A1 | 6/2010 | Camp, Jr. et al. |
| 2010/0150461 A1 | 6/2010 | Iwami |
| 2010/0166055 A1* | 7/2010 | Schmit et al. ............ 375/240.01 |
| 2010/0167816 A1* | 7/2010 | Perlman et al. ................. 463/30 |
| 2010/0195742 A1 | 8/2010 | Wu |
| 2010/0220175 A1 | 9/2010 | Claydon et al. |

(Continued)

*Primary Examiner* — Kate Luo

(74) *Attorney, Agent, or Firm* — Thomas | Horstemeyer, LLP

(57) ABSTRACT

Disclosed are various embodiments for adjusting the encoding of a video signal into a video stream based on user attention. A video signal is encoded into a video stream. A temporary lapse of attention by a user of the interactive application is predicted. The encoding of the video signal into the video stream is adjusted from an initial state to a conservation state in response to predicting the temporary lapse of attention by the user. The conservation state is configured to conserve one or more resources used for the video stream relative to the initial state.

20 Claims, 6 Drawing Sheets

(56) References Cited

U.S. PATENT DOCUMENTS

2010/0283972 A1 11/2010 Plant et al.
2011/0054649 A1 3/2011 Sarkis et al.
2011/0258656 A1 10/2011 Michel
2012/0271194 A1 10/2012 MacLullich et al.

* cited by examiner

ALTERING STREAMING VIDEO ENCODING BASED ON USER ATTENTION

CROSS-REFERENCE TO RELATED APPLICATIONS

This application is a divisional of, and claims priority to, co-pending U.S. Patent Application entitled "ALTERING STREAMING VIDEO ENCODING BASED ON USER ATTENTION," filed on Dec. 1, 2010, and assigned application Ser. No. 12/957,450, which is incorporated herein by reference in its entirety.

BACKGROUND

A video signal is typically encoded by one or more video encoders in order to generate a video stream capable of being sent over a data communications network. Such encoding is useful to reduce the bitrate associated with the video signal, thereby allowing the video stream to fit within the bandwidth constraints of the network. Data reduction is also helpful in some systems to permit forward error correction data to be transmitted in the video stream. However, video encoders may be resource intensive, sometimes requiring significant processing and/or memory resources in order to achieve acceptable video quality.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to adjusting the encoding of a video signal into a video stream based on user attention or anticipated user attention. Given that a video stream may use significant encoding resources and/or network bandwidth resources, it may be desirable to reduce such resource consumption when a user is not paying attention to the video stream. In some cases, it may be desirable to reduce such resource consumption even when a user is not paying attention merely to a portion of a screen rendered from the video stream.

Various embodiments of the present disclosure adjust the encoding of a video signal generated by an interactive application into a video stream based on the attention of the user. As a non-limiting example, a user who is playing a game may leave the room temporarily or otherwise might not pay attention to a video stream that is encoded from a video signal generated by the game. Accordingly, a video encoder that encodes the video signal into the video stream may be adjusted to stop encoding or to reduce resource consumption during a temporary lapse of attention by the user to the video stream.

As another non-limiting example, an event occurring in a portion of a game screen may draw the attention of the user and induce a saccade. A saccade is a rapid movement of the eyes as they jump from fixation on one point to another. When a person shifts visual focus to something that is moving, the person perceives a smooth visual experience. However, the actual physiology involved differs from the perception. In reality, the eye unfocuses, the muscles controlling the eye aim the eye to focus on another object, and the eye refocuses on the other object.

During this time, which may last approximately between 30 and 50 milliseconds, the visual field is edited out by the brain, and the brain fills in the gap. If something unusual occurs in the visual field during the saccade, the user does not perceive it due to this saccadic masking phenomenon. Accordingly, a video encoder that encodes the video signal of the game may be adjusted to reduce resource consumption while the user is experiencing saccadic masking. In the following discussion, a general description of the system and its components is provided, followed by a discussion of the operation of the same.

Figure 1:
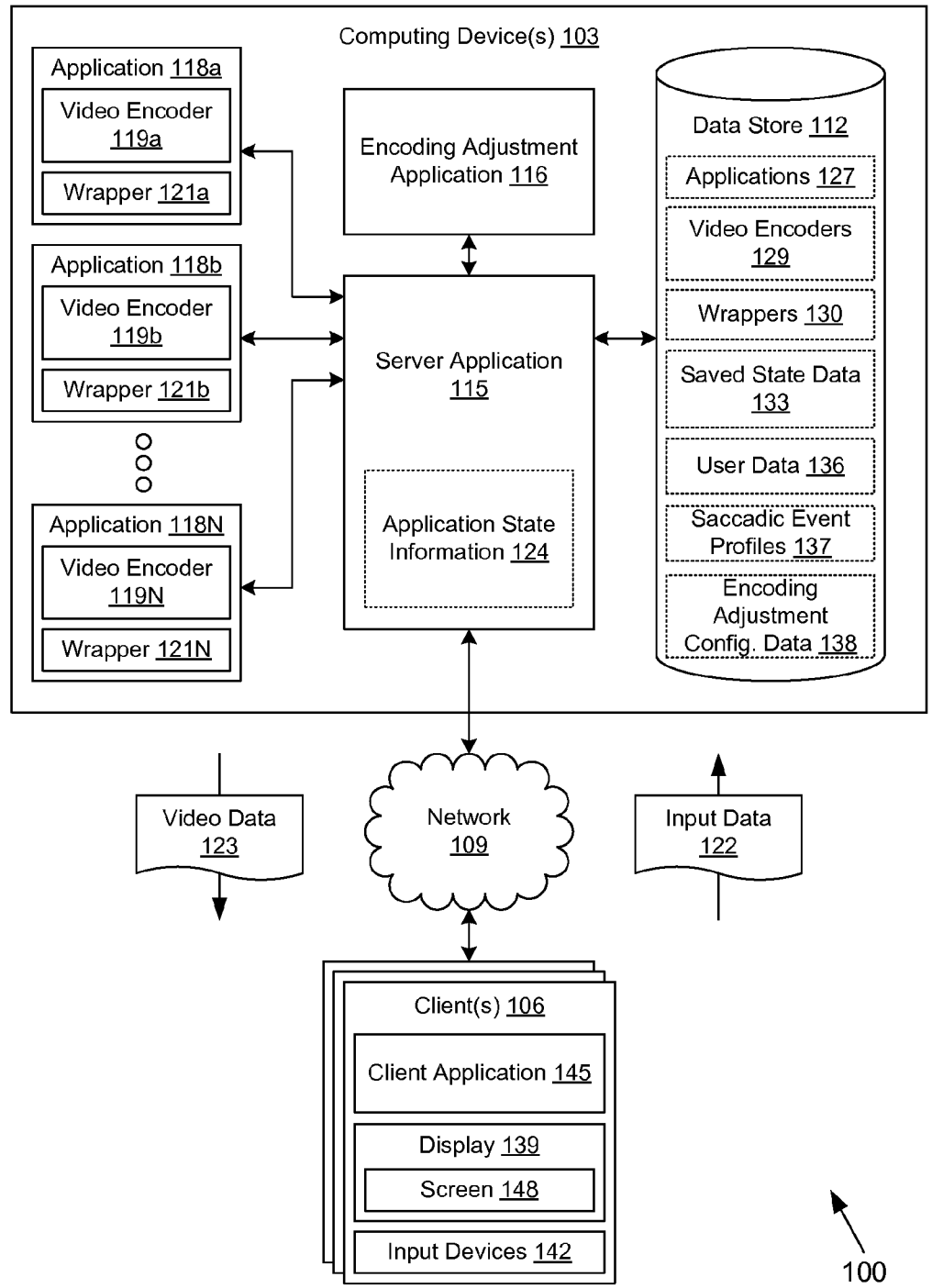
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of networked computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, an encoding adjustment application 116, a plurality of applications 118a, 118b . . . 118N, a plurality of video encoders 119a, 119b . . . 119N, a plurality of wrappers 121a, 121b . . . 121N, and other applications, services, processes, systems, engines, or functionality not discussed in detail herein. The server application 115 is executed to launch applications 118, which may be executed within wrappers 121 that provide a virtualized environment. Although the principles of the present disclosure are illustrated with reference to applications 118 that are executed in remote servers, it is understood that the principles are applicable to any video stream that depicts saccade-inducing events or may be susceptible to user inattention. Non-limiting examples of such video streams may include movies, television programs, televised sports programs, etc. Although games are discussed herein as particular examples of applications 118, it is understood that the applications 118 may correspond to many different types of interactive applications other than merely games in various embodiments.

The server application 115 is executed to obtain input data 122 from the clients 106 and provide the input data 122 to the respective wrapper 121. The server application 115 is also executed to send video data 123 that is captured from the application 118 to the clients 106 as a video stream. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain application state information 124 associated with the executing applications 118.

The application 118 is an interactive application such as, for example, a game. The application 118 may be a single-player game, a multiple-player game, or include both single player and multiple player modes. As non-limiting examples, the application 118 may correspond to a first-person shooter game, an action game, an adventure game, a party game, a role-playing game, a simulation game, a strategy game, a vehicle simulation game, and/or other types of games. The application 118 may be a game originally designed for execution in a general-purpose computing device or in a specialized video game device such as, for example, a video game console, a handheld game device, an arcade game device, etc. The application 118 may expect to access one or more resources of the device on which it is executed. Such resources may correspond to display devices, input devices, or other devices. In some cases, the application 118 may request exclusive access to one or more of the resources, whereby no other applications may have access to the particular resources.

The video encoder 119 is able to encode a video signal generated by the application 118 into a video stream for transmission over the network 109 to clients 106. The video stream may include an audio signal generated by the application 118 as well. To this end, the video encoder 119 may include various types of video and audio encoders, such as, for example, Moving Pictures Experts Group (MPEG) encoders, H.264 encoders, Flash® video encoders, etc. Such encoders may be selected according to factors such as, for example, data reduction, encoding quality, latency, etc.

The video encoder 119 may introduce various encoding artifacts into the video stream that were not present in the video signal. Such encoding artifacts may comprise macroblocking, pixelation, "mosquito noise," and/or other forms of encoding artifacts. The presence and severity of the encoding artifacts may depend on various factors, such as the content of the video signal, the maximum bitrate of the video stream, the data reduction approach employed by the particular video encoder 119, etc.

In general, it may be the case that video encoders 119 that are configured to use lesser processing resources may produce video streams of lower quality at a specified bitrate when compared to video encoders 119 that are configured to use greater processing resources and produce video streams at the same specified bitrate. Further, it may generally be the case that video streams that are encoded at a lower bitrate have a lower quality than video streams that are encoded at a higher bitrate. Therefore, reducing consumption of resources such as processing resources and network bandwidth resources may result in lower quality video streams.

The encoding adjustment application 116 is executed to detect periods of user inattention and to make adjustments to the corresponding video encoder 119 to conserve one or more resources consumed by the video stream. For example, the encoding adjustment application 116 may configure the video encoder 119 to stop encoding a video stream while a user is not paying attention to the rendered video stream. Alternatively, the encoding adjustment application 116 may configure the video encoder to encode the video stream using a lesser quality encoding to conserve resources while a user is not paying attention to the rendered video stream.

In addition, the encoding adjustment application 116 may be executed to detect whether a rapid change is present in one or more frames of the video signal that is to be encoded. Such a rapid change may be predicted to draw the attention of the user to a region of the video frame where the rapid change is occurring, thereby inducing a saccade. In one embodiment, the encoding adjustment application 116 may compare frames of the video signal to previous frames of the video signal to ascertain whether a rapid change is present. In another embodiment, the encoding adjustment application 116 may be able to correlate frames of the video signal to a profile of the application 118 that indicates whether a rapid change is anticipated. In yet another embodiment, the encoding adjustment application 116 may obtain event indications from the application 118 that notify the encoding adjustment application 116 that a rapid change is anticipated.

The encoding adjustment application 116 may configure the video encoder 119 to use lesser resources in encoding the video stream when a saccade-inducing event is present in the video signal. Because the attention of the user is drawn to the region of rapid change, other areas of the video signal may be encoded to use less data, less processing time, etc. for the duration of the saccade-inducing event. Such an event may last, for example, two to three frames, 30 to 50 milliseconds, or some other duration. In one embodiment, the entire video frame may be encoded with a lesser quality encoding for at least a portion of the duration of the saccade-inducing event to take advantage of the saccade-masking phenomenon.

In addition to reconfiguring the video encoder 119, the encoding adjustment application 116 may be capable of reconfiguring the application 118 to conserve resources used in generating the video signal. For example, the encoding adjustment application 116 may configure the application 118 to generate a video signal with a lower resolution, fewer colors, fewer rendered polygons, etc. In various embodiments, the encoding adjustment application 116 may interface with one or more graphics libraries used by the application 118 (e.g., DirectX®, etc.) to accomplish such an adjustment. Such an adjustment of the source video signal may also result in using fewer resources in encoding the source video signal.

The wrapper 121 corresponds to an application that provides a virtualized environment for execution of the application 118. In particular, the wrapper 121 may be configured to virtualize one or more of the resources that the application 118 expects to access. Such resources may include a keyboard, a mouse, a joystick, a video device, a sound device, etc. In this way, the wrapper 121 is able to provide input commands to the application 118 as if the wrapper 121 emulates a keyboard, a mouse, or another type of input device.

Different types of wrappers 121 may be provided for different applications 118 or classes of applications 118. As non-limiting examples, different wrappers 121 may be provided for applications 118 using different application programming interfaces (APIs) such as OpenGL®, DirectX®, the Graphics Device Interface (GDI), and so on. Where the application 118 is configured for execution in a specialized video game device or another type of computing device, the wrapper 121 may include an emulation application that emulates the device. The wrapper 121 may be configured to deliver the video signal generated by the application 118 to the video encoder 119 for encoding.

The application state information 124 that is maintained by the server application 115 includes various data relating to application sessions that are currently active. For example, the application state information 124 may track the users that are currently participating in the application session, scores and status information associated with the users, security permissions associated with the application session (e.g., who can or cannot join), and so on. In some embodiments, some or all of the application state information 124 may be discarded when an application session ends.

The data stored in the data store 112 includes, for example, applications 127, video encoders 129, wrappers 130, saved state data 133, user data 136, saccadic event profiles 137, encoding adjustment configuration data 138, and potentially other data. The applications 127 correspond to a library of video games or other applications that are available to be launched as applications 118. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 118 for multiple application sessions.

The video encoders 129 correspond to the various types of video encoders 119 that may be employed in the computing device 103. Some video encoders 129 may correspond to specific formats, such as, for example, H.264, MPEG-4, MPEG-2, 3D video streams, and/or other formats. The wrappers 130 correspond to the executable code that implements the various types of wrappers 121. The wrappers 130 are executable in the computing device 103 and may be executed as multiple instances of the wrappers 121 for multiple application sessions.

The saved state data 133 corresponds to application states that have been saved by the applications 118. Because the applications 118 are executed in a virtualized environment, the applications 118 may write state information to a virtual location, which is then mapped for storage in the data store 112 as the saved state data 133. The saved state data 133 may correspond to data saved normally by the application 118 or may correspond to a memory image of the application 118 that may be resumed at any time. The user data 136 includes various data related to the users of the applications 118, such as, for example, security credentials, application preferences, billing information, a listing of other users that are permitted to join application sessions started by the user, and so on.

The saccadic event profiles 137 include data that assists the encoding adjustment application 116 in detecting saccade-inducing events in video signals. To this end, the saccadic event profiles 137 may include fingerprints that may be applied to frames of a video signal in order to detect the occurrence of a saccade-inducing event. As a non-limiting example, an explosion in a certain application 118 may be understood to cause a saccade. Such an explosion may be associated with a characteristic fireball graphic. A fingerprint of this graphic may be stored in the saccadic event profiles 137. The fingerprint may be later used by the encoding adjustment application 116 to detect the saccadic event based on the presence of the characteristic graphic in a video frame.

Additionally, an application 118 may provide metadata regarding the game play represented in the video signal by way of an application programming interface (API). Such metadata may describe the occurrence of an event in a video signal that may predicted to induce a saccade in the user, e.g., explosions, sudden appearances of enemies, sudden changes in lighting or contrast, and so on. The saccadic event profiles 137 may describe indications of certain such events as saccade-inducing events.

The encoding adjustment configuration data 138 includes various configurations that may be applied to video encoders 119 and/or applications 118. The encoding adjustment configuration data 138 may include initial configurations and conservation configurations that are used to conserve resources associated with the video stream and/or video signal. As a non-limiting example, an initial configuration may specify that a video signal is to be encoded with an H.264 video encoder 129 with a 1024×768 pixel resolution, at 60 frames per second, with 16 bit color, and at a 2.0 Megabit per second bitrate. As another non-limiting example, a conservation configuration may specify that a portion of the video signal is to be encoded to be encoded with an H.264 video encoder 129 with a 1024×768 pixel resolution, at 24 frames per second, with 8 bit color, and at a 256 Kilobit per second bitrate. The resolution of a portion of the video signal may also change in the conservation configuration, though the portion of the video signal may be rendered with the same size relative to the rest of the video signal.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, haptic devices, webcams, and/or any other devices that can provide user input.

The client 106 may be configured to execute various applications such as a client application 145 and/or other applications. The client application 145 is executed to allow a user to launch, join, play, and otherwise interact with an application 118 executed in the computing device 103. To this end, the client application 145 is configured to capture input provided by the user through one or more of the input devices 142 and send this input over the network 109 to the computing device 103 as input data 122.

The client application 145 is also configured to obtain video data 123 over the network 109 from the computing device 103 and render a screen 148 on the display 139. To this end, the client application 145 may include one or more video and audio players to play out a video stream generated by a video encoder 119. In one embodiment, the client application 145 comprises a plug-in within a browser application. The client 106 may be configured to execute applications beyond the client application 145 such as, for example, browser applications, email applications, instant message applications, and/or other applications.

Next, a general description of the operation of the various components of the networked environment 100 is provided. To begin, a user at a client 106 sends a request to launch an application 118 to the server application 115. The server application 115 obtains the corresponding application 127 and wrapper 130 from the data store 112. The server application 115 then launches the application 118 in the corresponding wrapper 121. The server application 115 tracks the status of the application session within the application state information 124.

The wrapper 121 provides a virtualized environment for the application 118 that virtualizes one or more resources of the computing device 103. Such resources may include exclusive resources, i.e., resources for which the application 118 requests exclusive access. For example, the application 118 may request full screen access from a video device, which is an exclusive resource because normally only one application can have full screen access. Furthermore, the wrapper may virtualize input devices such as, for example, keyboards, mice, etc., which may not actually be present in the computing device 103. In various embodiments, the wrapper 121 may correspond to a virtual machine and/or the wrapper 121 may be executed within a virtual machine.

The user at the client 106 enters input commands for the application 118 by use of the input devices 142 of the client 106. As a non-limiting example, the user may depress a left mouse button. Accordingly, the client application 145 functions to encode the input command into a format that may be transmitted over the network 109 within the input data 122. The server application 115 receives the input command and passes it to the wrapper 121. The wrapper 121 then provides a left mouse button depression to the application 118 by way of a virtualized mouse. In some embodiments, different input commands may be presented to the application 118 from those that were generated by a client 106. As a non-limiting example, if a user sends a mouse down command and the client application 145 loses focus, the wrapper 121 may be configured to send a mouse down command followed by a mouse up command. In various embodiments, the input commands may be relayed to the wrapper 121 as soon as possible, or the input commands may be queued by the wrapper 121 and relayed to the application 118 sequentially from the queue according to another approach.

Various embodiments enable input generated through one type of input device 142 in a client 106 to be transformed by the wrapper 121 into input commands provided to the application 118 through an entirely different type of virtual input device. As a non-limiting example, input generated by an accelerometer in the client 106 may be translated by the wrapper 121 into input provided through a virtual mouse. Thus, completely different kinds of input devices 142 may be used in the application 118 that may not have been contemplated when the application 118 was implemented.

Moreover, because the client 106 is decoupled from the hardware requirements of the application 118, the application 118 may be used in a diverse variety of clients 106 that are capable of streaming video with acceptable bandwidth and latency over a network 109. For example, the application 118 may be used on a client 106 that is a smartphone. Thus, the client 106 need not include expensive graphics hardware to perform the complex three-dimensional rendering that may be necessary to execute the application 118. By contrast, the hardware of the computing device 103 may be upgraded, as needed, to meet the hardware requirements of the latest and most computationally intensive applications 118. In various embodiments, the video stream encoded by the video encoder 119 may be scaled according to the bitrate and/or other characteristics of the connection between the computing device 103 and the client 106 over the network 109.

The graphical output of the application 118 is captured by the wrapper 121 and encoded into a video stream. Additionally, the audio output of the application 118 may be captured and multiplexed into the video stream. The video stream is transmitted by the server application 115 to the client 106 over the network 109 as the video data 123. The client application 145 obtains the video data 123 and plays it out on the display 139 in a screen 148.

Figure 2A:
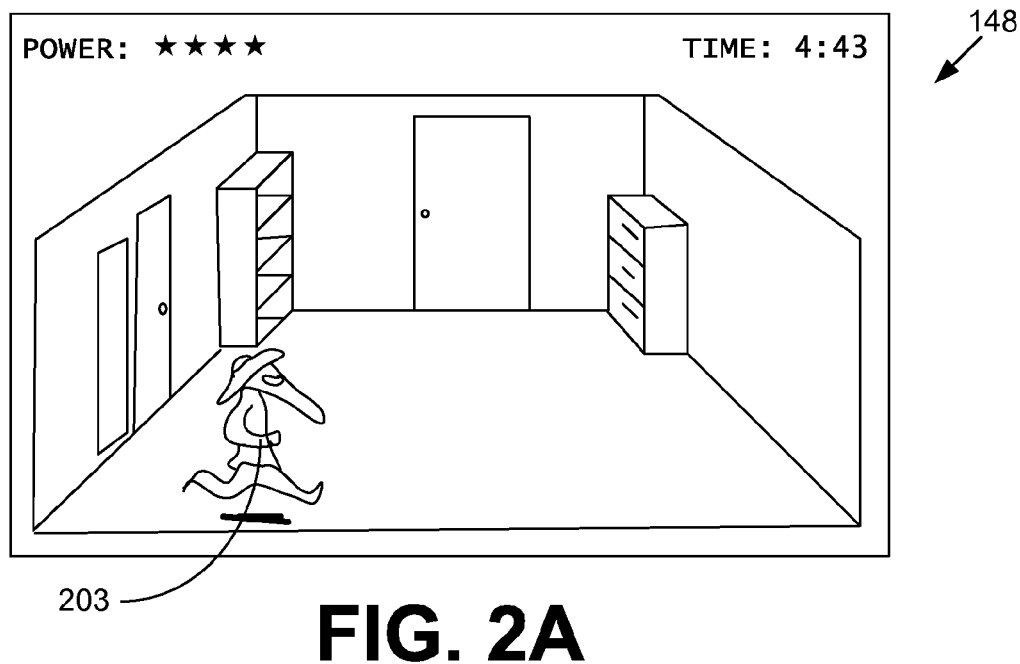
FIGS. 2A-2C are drawings of user interfaces rendered by a client in the networked environment of FIG. 1 according to various embodiments of the present disclosure.
Figure 2B:
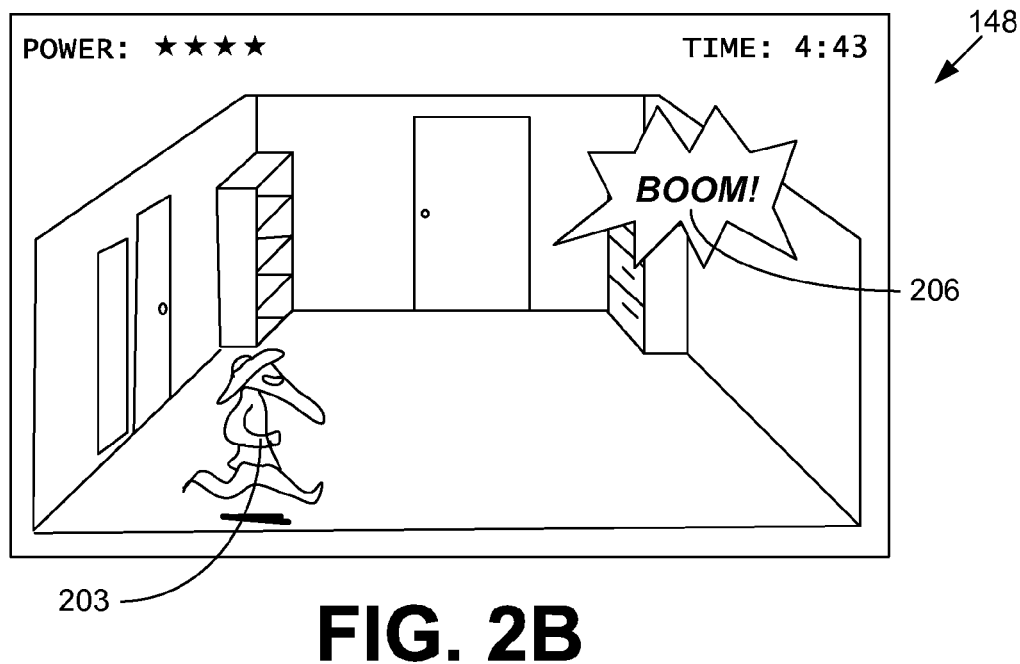
Figure 2C:
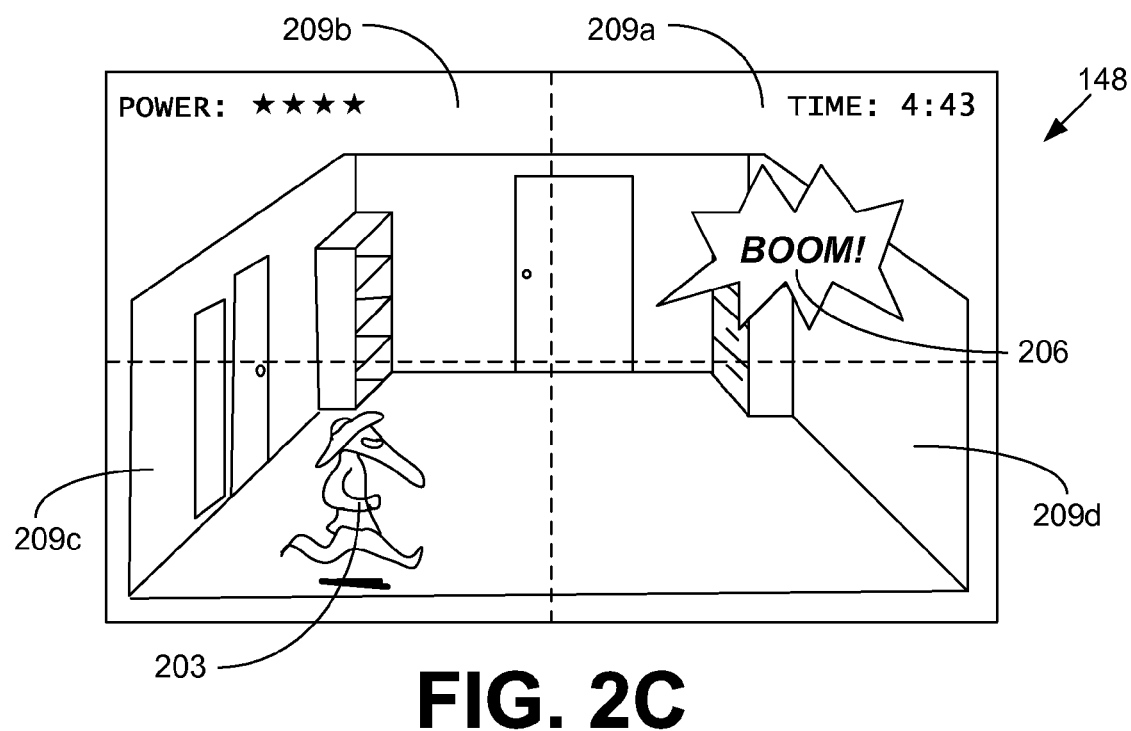

Turning now to FIGS. 2A-2C, shown are examples of user interfaces rendered by the client application 145 (FIG. 1) executed in the client 106 (FIG. 1) in the networked environment 100 (FIG. 1). In particular, FIG. 2A depicts a screen 148 rendered on the display 139 (FIG. 1) from a video stream. The screen 148 in FIG. 2A shows a sprite 203 that is being controlled by the user. In some embodiments, it may be assumed by the encoding adjustment application 116 (FIG. 1) that the user is paying attention to the sprite 203 based on receipt of an input command controlling the sprite 203.

In FIG. 2B, a saccadic event 206 occurs, which corresponds to an explosion in the game environment. The encoding adjustment application 116 may then determine that the attention of the user is directed to the saccadic event 206. When the user moves from paying attention to the sprite 203 to the saccadic event 206, a saccade may occur in the user. Although the attention of the user moves from a sprite 203 to a saccadic event 206, it is understood that the attention of the user may move from another saccadic event 206 to the saccadic event 206. Further, the attention of the user may move from an undetermined location on the screen 148 to the saccadic event 206.

During and relative to a predicted saccade, the encoding adjustment application 116 may configure the video encoder 119 (FIG. 1) to conserve resources associated with encoding the video stream where the user is not likely to perceive quality problems. Such resources may include processor time and/or memory consumed by the video encoder 119 and/or bandwidth on the network 109 (FIG. 1) consumed by the resulting video stream.

FIG. 2C shows a division of FIG. 2B into four regions 209a, 209b, 209c, and 209d. The saccadic event 206 corresponds to a rapid change in region 209a. The sprite 203 is located in region 209c. As the attention of the user is drawn from region 209c to 209a, the video encoder 119 may be configured to encode regions 209b, 209c, and 209d with a lower quality to reduce resource consumption. Because the user is predicted to experience a saccade, the user is unlikely to perceive the reduction in quality. Accordingly, the experience of the user in playing the application 118 (FIG. 1) is not degraded.

Although the operation of the encoding adjustment application 116 is described in relation to a video signal generated by an application 118, it is understood that principles of the present disclosure may be applied to any other encoding of video signals into video streams. For example, explosions, changes in contrast, appearance of characters, etc. may occur in television programs, movies, and so on. Accordingly, various embodiments of the present disclosure may be able to recognize saccadic events 206 in television programs, movies, etc. Moreover, various embodiments of the present disclosure may be able to detect user inattention regarding a video stream of television programs, movies, etc.

Figure 3:
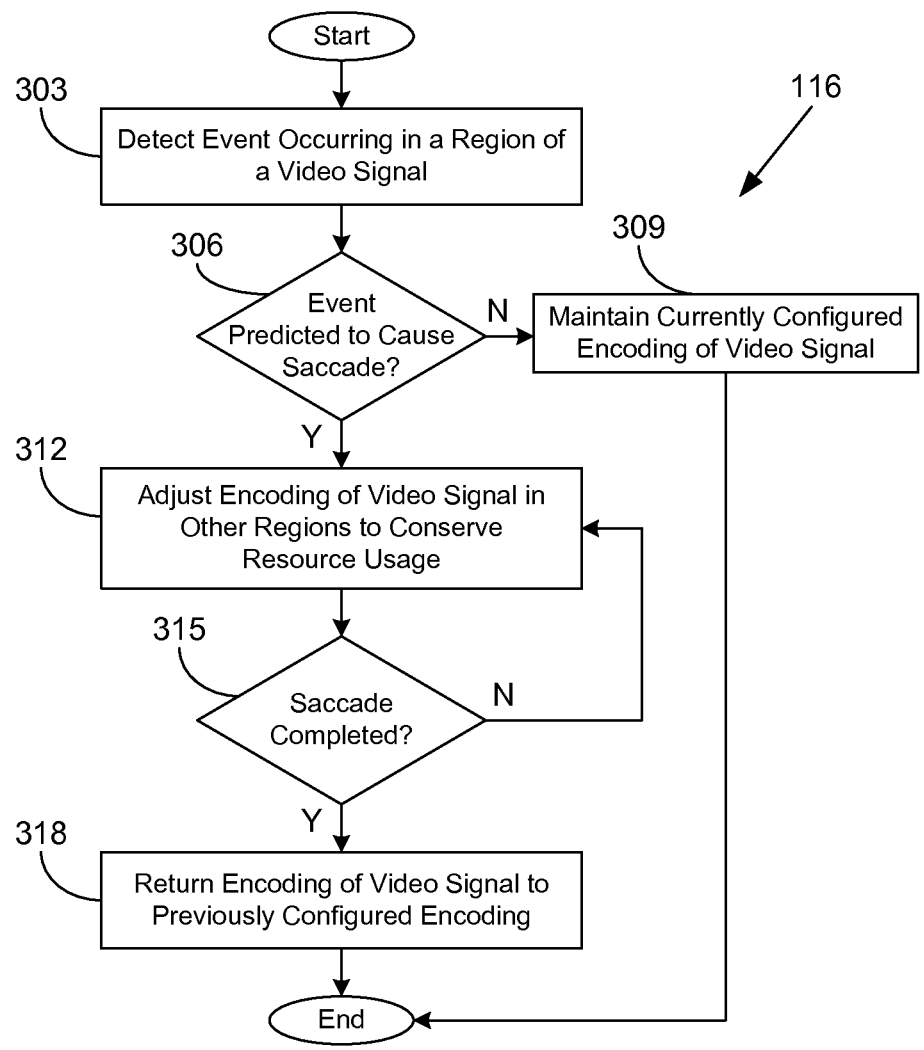
FIGS. 3 and 4 are flowcharts illustrating examples of functionality implemented as portions of an encoding adjustment application executed in a computing device in the networked environment of FIG. 1 according to various embodiments of the present disclosure.

Referring next to FIG. 3, shown is a flowchart that provides one example of the operation of a portion of the encoding adjustment application 116 according to various embodiments. It is understood that the flowchart of FIG. 3 provides merely an example of the many different types of functional arrangements that may be employed to implement the operation of the portion of the encoding adjustment application 116 as described herein. As an alternative, the flowchart of FIG. 3 may be viewed as depicting an example of steps of a method implemented in the computing device 103 (FIG. 1) according to one or more embodiments.

Beginning with box 303, the encoding adjustment application 116 detects an event occurring in a region of a video signal. Specifically, the region may correspond to a region in one or more frames of the video signal. The encoding adjustment application 116 may detect the event by identifying a rapid change in color, luminosity, and/or other video characteristics relative to previous frames of the video signal. Alternatively, the encoding adjustment application 116 may identify a graphical event in the video signal according to a fingerprint stored in the saccadic event profiles 137 (FIG. 1). In some embodiments, the encoding adjustment application 116 may receive an indication from the corresponding application 118 (FIG. 1) that an event is occurring.

In box 306, the encoding adjustment application 116 determines whether the event detected in box 303 is predicted to cause a saccade. Where the encoding adjustment application 116 obtains the indication that the event is occurring from the application 118, the encoding adjustment application 116 may correlate the indication with a saccadic event by using data stored in the saccadic event profiles 137. Where the encoding adjustment application 116 detects a rapid change between frames, the encoding adjustment application 116 may refer to one or more thresholds stored in the saccadic event profiles 137 to determine whether the rapid change is likely to attract the attention of the user and induce a saccade.

If the encoding adjustment application 116 determines that the event is not predicted to cause a saccade, the encoding adjustment application 116 maintains the currently configured encoding of the video signal in box 309. In other words, the event may not be significant enough or may not be distinct enough from other action occurring in the video signal to attract the attention of the user to the event. It may also be the case that the user may be predicted to have become accustomed to the specific type of event due to location on the display 139 (FIG. 1), frequency of repetition, recent repetition, and/or other factors. If the user is accustomed to the event, or if another event had just occurred in or near the same location, a saccade may be unlikely. Thereafter, the portion of the encoding adjustment application 116 ends.

Otherwise, if the encoding adjustment application 116 determines that the event is predicted to cause a saccade, the encoding adjustment application 116 proceeds to box 312. In box 312, the encoding adjustment application 116 adjusts the encoding of the video signal in the other regions of the video frames to conserve resource usage. The encoding adjustment application 116 may configure the video encoder 119 (FIG. 1) to move from an initial state with an initial encoder configuration to a conservation state with a conservation encoder configuration.

Such configurations may be loaded from the encoding adjustment configuration data 138 (FIG. 1). Such a conservation encoder configuration may result in lower memory usage, lower processor usage, lower network bandwidth usage, and/or other reductions in resource consumption associated with the video stream. In some embodiments, the entire video signal may be encoded in a lower quality during the time period of the saccade to take advantage of saccadic masking while the eye is re-aimed from one position on the screen 148 (FIG. 1) to another.

Next, in box 315, the encoding adjustment application 116 determines whether the saccade is completed. In other words, the encoding adjustment application 116 determines whether the user is predicted to be focused on the region of the screen 148 that contains the saccade-inducing event. If the user is focused on that area, the user may then look at another area of the screen 148 at any time. If the saccade has not completed, the encoding adjustment application 116 returns to box 312 and maintains the adjusted encoding configuration of the video signal that conserves resources.

If the saccade has completed, the encoding adjustment application 116 continues to box 318 and returns the encoding of the video signal to the previously configured encoding. Because the user may look at some other area of the screen 148, the encoding configuration of the video encoder 119 may be readjusted to use the initial, higher-quality encoding configuration. Thereafter, the portion of the encoding adjustment application 116 ends.

Figure 4:
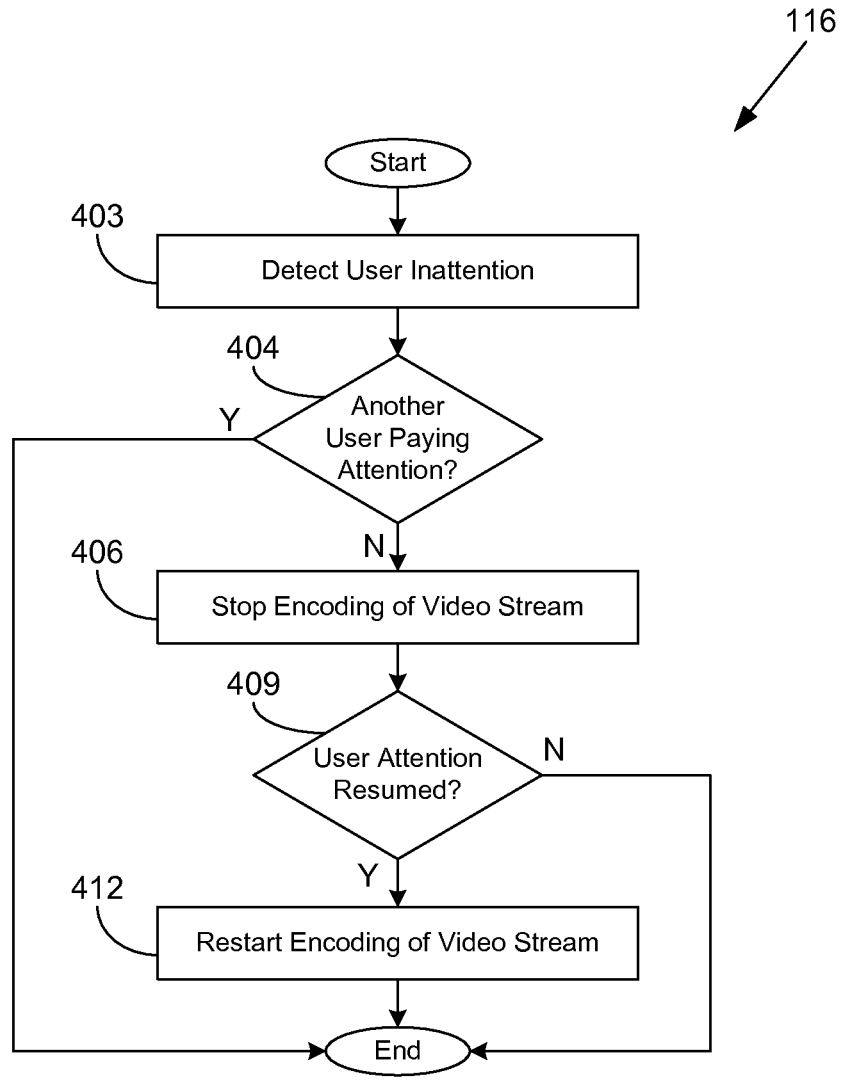

Moving on to FIG. 4, shown is a flowchart that provides one example of the operation of another portion of the encoding adjustment application 116 according to various embodiments. It is understood that the flowchart of FIG. 4 provides merely an example of the many different types of functional arrangements that may be employed to implement the operation of the portion of the encoding adjustment application 116 as described herein. As an alternative, the flowchart of FIG. 4 may be viewed as depicting an example of steps of a method implemented in the computing device 103 (FIG. 1) according to one or more embodiments.

Beginning with box 403, the encoding adjustment application 116 detects user inattention. As a non-limiting example, the user may be talking on telephone, in another room, or otherwise not paying attention to the screen 148 (FIG. 1). Accordingly, the user is not moving a mouse, not typing on the keyboard, etc. Therefore, no input data 122 (FIG. 1) is obtained by the server application 115 (FIG. 1) when the user is not paying attention to the screen 148. When a predetermined time period elapses, the encoding adjustment application 116 may regard the user as idle and not paying attention. As another non-limiting example, if the user minimizes the client application 145 (FIG. 1), the client application 145 may be configured to send an indication of user inattention to the server application 115.

In box 404, the encoding adjustment application 116 determines whether another user participating in the game session is paying attention. If another user is paying attention, the video stream encoding continues unaffected, and the portion of the encoding adjustment application 116 ends. However, if no other users are paying attention, the encoding adjustment application 116 proceeds to box 406.

In box 406, the encoding adjustment application 116 stops the encoding of the video signal into the video stream. In other embodiments, the encoding adjustment application 116 may instead configure the video encoder 119 (FIG. 1) to encode the video signal into a lower quality video stream. In either case, processing resources and/or network resources may be conserved. Where the encoding is stopped completely, the video encoder 119 may be terminated, thereby freeing up memory of the computing device 103. However, the application 118 (FIG. 1) may continue to execute in the computing device 103 and generate the video signal even though the corresponding video encoder 119 has been terminated.

In box 409, the encoding adjustment application 116 determines whether the user has resumed paying attention to the screen 148. The user may have actuated an input device 142 (FIG. 1), thereby causing input data 122 to be sent to the server application 115. Alternatively, the user may have restored a client application 145 that had been minimized, thereby causing the client application 145 to send an indication of visibility to the computing device 103.

If the user has resumed paying attention, the encoding adjustment application 116 continues to box 412 and restarts the encoding of the video signal into the video stream. In another embodiment, the encoding adjustment application 116 may reconfigure the video encoder 119 to use an initial configuration after employing a conservation configuration while the user was inattentive. If the video encoder 119 had been terminated, a new instance of the video encoder 119 may be launched and configured to perform the encoding of the video signal into the video stream. Thereafter, the portion of the encoding adjustment application 116 ends.

Otherwise, if the user does not resume paying attention, the encoding may remain stopped or may continue according to the conservation configuration. If the encoding continues according to the conservation configuration, it may be stopped entirely after the expiration of a timeout period. Additionally, the application 118 and/or the wrapper 121 (FIG. 1) may be stopped by the server after the expiration of a timeout period. Thereafter, the portion of the encoding adjustment application 116 ends.

Figure 5:
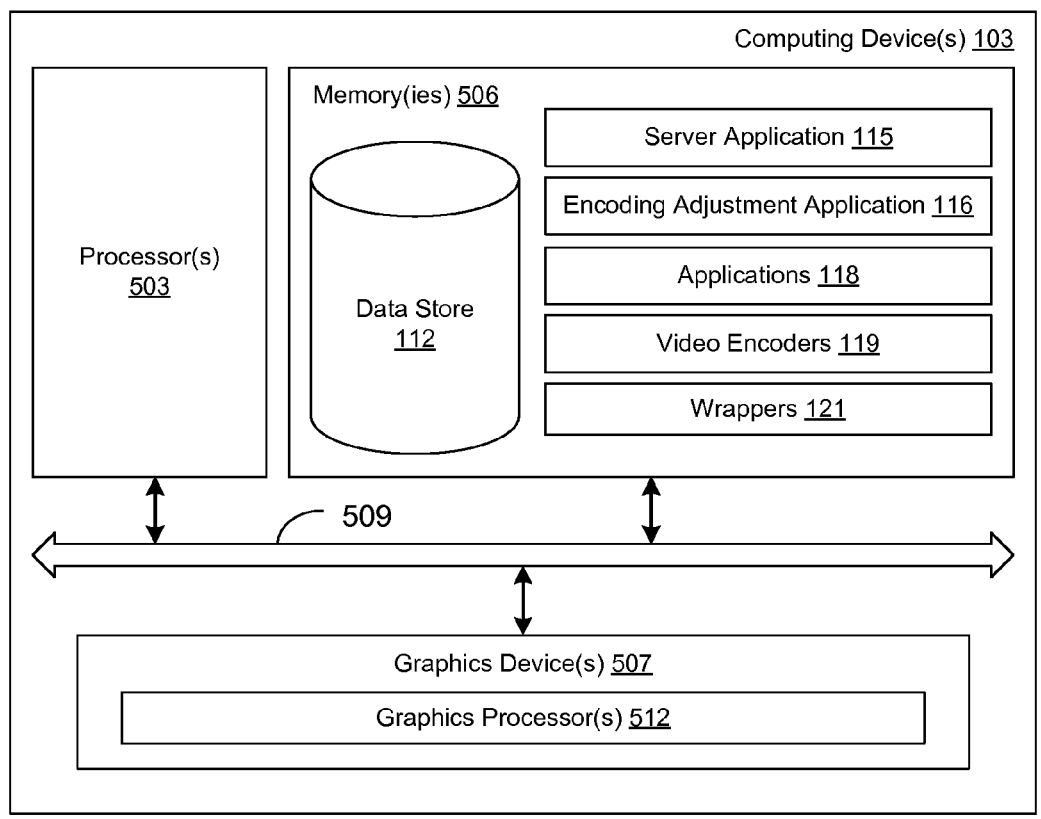
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503, a memory 506, and one or more graphics devices 507, all of which are coupled to a local interface 509. To this end, the computing device 103 may comprise, for example, at least one server computer or like device. The local interface 509 may comprise, for example, a data bus with an accompanying address/control bus or other bus structure as can be appreciated. The graphics devices 507 may correspond to high-performance graphics hardware, including one or more graphics processors 512. Non-limiting examples of commercially available graphics processors 512 include the NVIDIA® Tesla series. The graphics devices 507 are configured to render graphics corresponding to the applications 118 executed in the computing device 103.

Stored in the memory 506 are both data and several components that are executable by the processor 503. In particular, stored in the memory 506 and executable by the processor 503 are the server application 115, the encoding adjustment application 116, the applications 118, the video encoders 119, the wrappers 121, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the server application 115, the encoding adjustment application 116, the applications 118, the video encoders 119, the wrappers 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the encoding adjustment application 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the encoding adjustment application 116, the applications 118, the video encoders 119, and the wrappers 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    encoding, by at least one computing device, a video signal generated by an interactive application into a video stream, wherein the interactive application is executed by the at least one computing device, and a user interacts with the interactive application by sending at least one input to the interactive application over a data communications network;
    predicting, by the at least one computing device, a temporary lapse of attention by the user to the video stream, wherein the temporary lapse of attention is predicted in response to a decrease in input by the user to the interactive application;
    adjusting, by the at least one computing device, an encoding of the video stream from an initial state to a conservation state in response to predicting the temporary lapse of attention;
    predicting, by the at least one computing device, that the temporary lapse of attention has ended;
    readjusting, by the at least one computing device, the encoding of the video stream from the conservation state to the initial state in response to predicting that the temporary lapse of attention has ended; and
    wherein the conservation state is configured to conserve at least one resource used for the encoding of the video stream relative to the initial state.

2. The method of claim 1, wherein predicting the temporary lapse of attention further comprises detecting, by the at least one computing device, that the user is not paying attention to the video stream.

3. The method of claim 1, wherein the interactive application comprises a game application that is executed by the at least one computing device, and the user interacts with the game application by sending at least one input to the game application over a data communications network.

4. The method of claim 1, wherein predicting the temporary lapse of attention further comprises determining, by the at least one computing device, that the interactive application has not obtained an input from the user in at least a predetermined time period.

5. The method of claim 1, wherein adjusting the encoding further comprises reconfiguring, by the at least one computing device, the interactive application to conserve at least one resource used in generating the video signal.

6. The method of claim 1, wherein adjusting the encoding further comprises stopping, by the at least one computing device, the encoding of a video signal into the video stream.

7. The method of claim 1, wherein adjusting the encoding further comprises reconfiguring, by the at least one computing device, a video encoder that performs the encoding to use a first encoding configuration that is associated with a lower quality video stream than a second encoding configuration that is used in the initial state.

8. The method of claim 1, wherein predicting that the temporary lapse of attention has ended further comprises determining, by the at least one computing device, that an interactive application has obtained at least one input from the user.

9. The method of claim 1, wherein readjusting the encoding further comprises restarting, by the at least one computing device, a stopped encoding of the video stream.

10. The method of claim 1, wherein readjusting the encoding further comprises reconfiguring, by the at least one computing device, a video encoder that performs the encoding to use an encoding configuration associated with the initial state.

11. A system, comprising:
- at least one computing device; and
- at least one application executed in the at least one computing device, wherein when executed the at least one application causes the at least one computing device to at least:
    - predict a temporary lapse of attention by a user to a video stream, the video stream including a video signal generated by an interactive application, wherein the user interacts with the interactive application by sending at least one input to the interactive application over a data communications network, and the temporary lapse of attention is predicted in response to a decrease in input by the user to the interactive application;
    - adjust an encoding of the video stream from an initial state to a conservation state in response to predicting the temporary lapse of attention;
    - predict that the temporary lapse of attention has ended;
    - readjust the encoding of the video stream from the conservation state to the initial state in response to predicting that the temporary lapse of attention has ended; and
    - wherein the conservation state is configured to conserve at least one resource used for the encoding of the video stream relative to the initial state.

12. The system of claim 11, wherein when executed the at least one application further causes the at least one computing device to receive an indication that the user is idle from a client device configured to render the video stream.

13. The system of claim 11, wherein when executed the at least one application further causes the at least one computing device to predict that an attention of the user is drawn to a saccadic event.

14. The system of claim 11, wherein when executed the at least one application further causes the at least one computing device to determine that input from the user is not received for at least a predetermined time period.

15. A non-transitory computer-readable medium embodying a program executable by at least one computing device, wherein when executed the program causes the at least one computing device to at least:
- encode a video signal generated by an interactive application into a video stream, wherein the interactive application is executed by the at least one computing device, and a user interacts with the interactive application by sending at least one input to the interactive application over a data communications network;
- send the video stream to a plurality of client devices corresponding to a plurality of users;
- predict a temporary lapse of attention by all of the plurality of users to the video stream, wherein the temporary lapse of attention is predicted in response to a decrease in input by the plurality of users to the interactive application;
- adjust an encoding of the video stream from an initial state to a conservation state in response to predicting the temporary lapse of attention;
- predict that the temporary lapse of attention has ended;
- readjust the encoding of the video stream from the conservation state to the initial state in response to predicting that the temporary lapse of attention has ended; and
- wherein the conservation state is configured to conserve at least one resource used for the encoding of the video stream relative to the initial state.

16. The non-transitory computer-readable medium of claim 15, wherein the plurality of users are participants in a session of the interactive application.

17. The non-transitory computer-readable medium of claim 15, wherein, as compared to the initial state, the conservation state is associated with at least one of: a lower resolution, a lower frame rate, a lower bitrate, or a lower color depth.

18. The non-transitory computer-readable medium of claim 15, wherein when executed the program further causes the at least one computing device to determine that the interactive application has not obtained an input from any of the plurality of users in at least a predetermined time period.

19. The non-transitory computer-readable medium of claim 15, wherein predicting the temporary lapse of attention further comprises detecting that the plurality of users are not paying attention to the video stream.

20. The non-transitory computer-readable medium of claim 15, wherein the interactive application comprises a game application.

* * * * *

UNITED STATES PATENT AND TRADEMARK OFFICE
CERTIFICATE OF CORRECTION

PATENT NO. : 9,253,494 B2
APPLICATION NO. : 14/554322
DATED : February 2, 2016
INVENTOR(S) : Patrick G. McCuller It is certified that error appears in the above-identified patent and that said Letters Patent is hereby corrected as shown below:

In the claims,

Column 14, line 49: change "a data" to --the data--

Column 14, line 61: change "a video" to --the video--

Column 15, line 3: change "that an" to --that the--

Signed and Sealed this
Sixteenth Day of August, 2016

Michelle K. Lee
*Director of the United States Patent and Trademark Office*